United States Patent [19]

Mattera

[11] Patent Number: 5,765,810
[45] Date of Patent: Jun. 16, 1998

[54] VEHICLE SELECTIVE JACKING SYSTEM

[76] Inventor: Frank Mattera, 1417 W. Market St., Pottsville, Pa. 17901

[21] Appl. No.: 796,797

[22] Filed: Feb. 6, 1997

[51] Int. Cl.⁶ .................................................. B66F 3/24
[52] U.S. Cl. .................................................. 254/423
[58] Field of Search ........................ 254/89 H, 93 VA, 254/418, 423

[56] References Cited

U.S. PATENT DOCUMENTS

| | | | |
|---|---|---|---|
| 1,279,500 | 9/1918 | Berry | 254/93 VA |
| 1,344,037 | 6/1920 | Heymann | 254/423 |
| 1,952,127 | 3/1934 | Goldman | 254/423 |
| 1,957,151 | 5/1934 | Pollard | 254/93 VA |
| 2,348,445 | 5/1944 | Bayer | 254/423 |
| 2,646,250 | 7/1953 | Fuster | 25/423 |
| 3,186,686 | 6/1965 | Mayer | 254/423 |
| 4,993,688 | 2/1991 | Mueller et al. | 254/423 |
| 5,232,206 | 8/1993 | Hunt et al. | 254/423 |
| 5,465,940 | 11/1995 | Guzman et al. | 254/423 |

*Primary Examiner*—Robert C. Watson

[57] ABSTRACT

A new Vehicle Selective Jacking System for automatically or manually elevating a motor vehicle for selectively making repairs. The inventive device includes an air compressor, a control panel electrically coupled to the air compressor, and a plurality of air jacks secured to the motor vehicle and connected to the air compressor by tubing. In an alternative embodiment, each air jack includes a handle for manually elevating the motor vehicle.

1 Claim, 3 Drawing Sheets

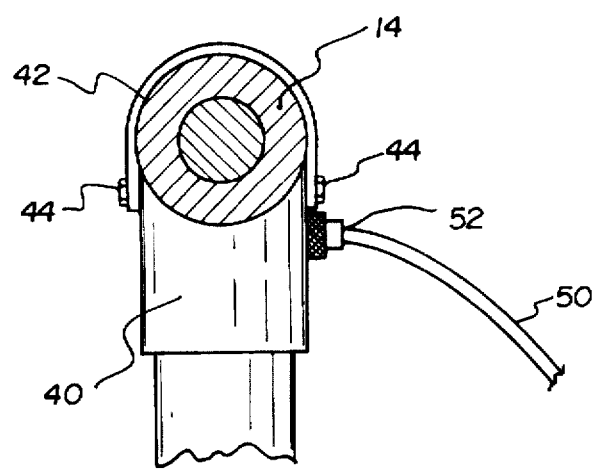
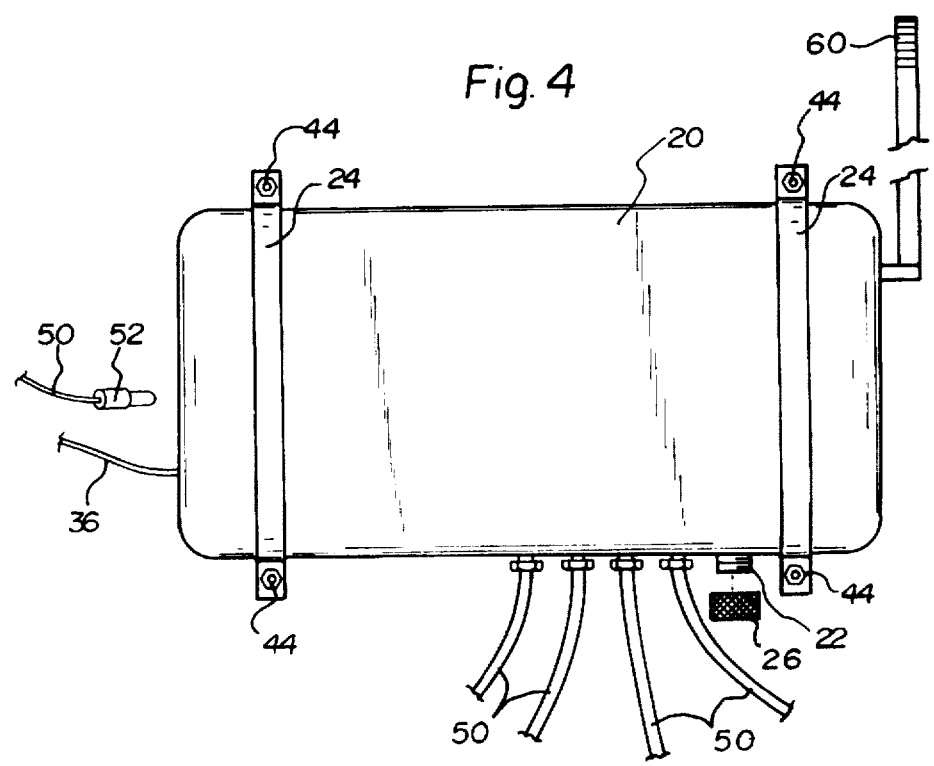

5,765,810

VEHICLE SELECTIVE JACKING SYSTEM

BACKGROUND OF THE INVENTION

1. Field of the Invention

The present invention relates to Vehicle Jack Devices and more particularly pertains to a new Vehicle Selective Jacking System for automatically or manually elevating a motor vehicle for selectively making repairs.

2. Description of the Prior Art

The use of Vehicle Jack Devices is known in the prior art. More specifically, Vehicle Jack Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Jack Devices include U.S. Pat. Nos. 4,993,688; 5,224,688; 5,232,206; 5,377,957; 4,150,813 and 5,219,429.

While these devices fulfill their respective, particular objectives and requirements, the aforementioned patents do not disclose a new Vehicle Selective Jacking System. The inventive device includes an air compressor, a control panel electrically coupled to the air compressor, and a plurality of air jacks secured to the motor vehicle and connected to the air compressor by tubing.

In these respects, the Vehicle Selective Jacking System according to the present invention substantially departs from the conventional concepts and designs of the prior art, and in so doing provides an apparatus primarily developed for the purpose of automatically or manually elevating a motor vehicle for selectively making repairs.

SUMMARY OF THE INVENTION

In view of the foregoing disadvantages inherent in the known types of Vehicle Jack Devices now present in the prior art, the present invention provides a new Vehicle Selective Jacking System construction wherein the same can be utilized for automatically or manually elevating a motor vehicle for selectively making repairs.

The general purpose of the present invention, which will be described subsequently in greater detail, is to provide a new Vehicle Selective Jacking System apparatus and method which has many of the advantages of the Vehicle Jack Devices mentioned heretofore and many novel features that result in a new Vehicle Selective Jacking System which is not anticipated, rendered obvious, suggested, or even implied by any of the prior art Vehicle Jack Devices, either alone or in any combination thereof.

To attain this, the present invention generally comprises an air compressor, a control panel electrically coupled to the air compressor, and a plurality of air jacks secured to the motor vehicle and connected to the air compressor by tubing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Vehicle Selective Jacking System apparatus and method which has many of the advantages of the Vehicle Jack Devices mentioned heretofore and many novel features that result in a new Vehicle Selective Jacking System which is not anticipated, rendered obvious, suggested, or even implied by any of the prior art Vehicle Jack Devices, either alone or in any combination thereof.

It is another object of the present invention to provide a new Vehicle Selective Jacking System which may be easily and efficiently manufactured and marketed.

It is a further object of the present invention to provide a new Vehicle Selective Jacking System which is of a durable and reliable construction.

An even further object of the present invention is to provide a new Vehicle Selective Jacking System which is susceptible of a low cost of manufacture with regard to both materials and labor, and which accordingly is then susceptible of low prices of sale to the consuming public, thereby making such Vehicle Selective Jacking System economically available to the buying public.

Still yet another object of the present invention is to provide a new Vehicle Selective Jacking System which provides in the apparatuses and methods of the prior art some of the advantages thereof, while simultaneously overcoming some of the disadvantages normally associated therewith.

Still another object of the present invention is to provide a new Vehicle Selective Jacking System for automatically or manually elevating a motor vehicle for selectively making repairs.

Yet another object of the present invention is to provide a new Vehicle Selective Jacking System which includes an air compressor, a control panel electrically coupled to the air compressor, and a plurality of air jacks secured to the motor vehicle and connected to the air compressor by tubing.

Still yet another object of the present invention is to provide a new Vehicle Selective Jacking System that reduces the chances of slippage from a conventional jack.

Even still another object of the present invention is to provide a new Vehicle Selective Jacking System that is easier to operate than a conventional jack thereby increasing the convenience for the driver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2.

FIG. 4 is a magnified bottom view of the air compressor.

DESCRIPTION OF THE PREFERRED EMBODIMENT

Figure 1:
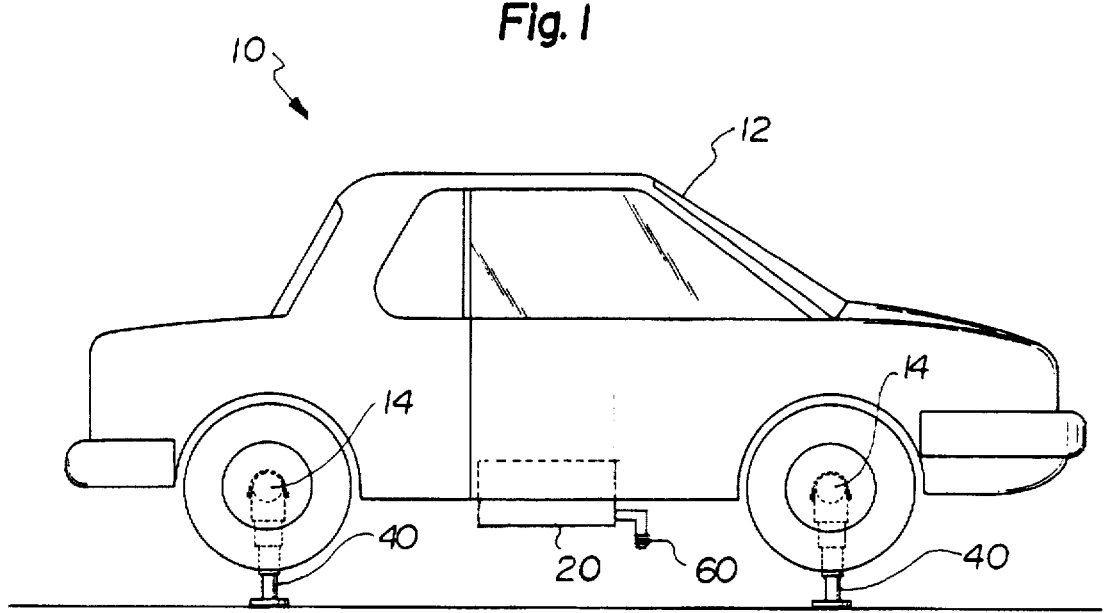
FIG. 1 is a side view of a new Vehicle Selective Jacking System according to the present invention.
Figure 2:
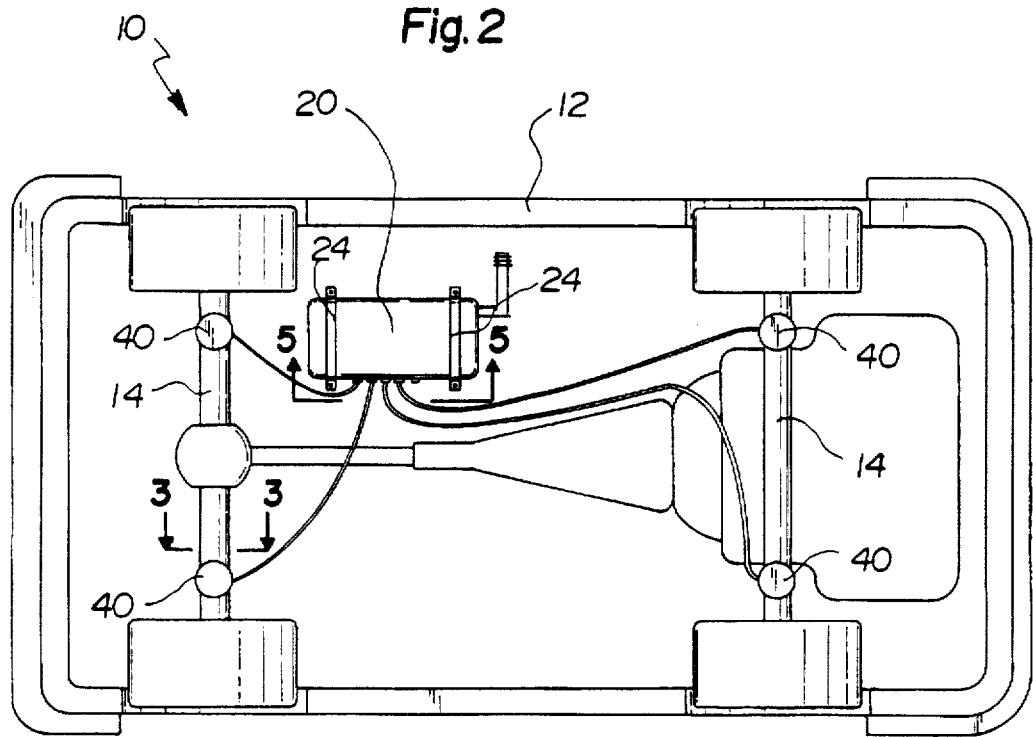
FIG. 2 is a bottom view of the present invention.
Figure 5:
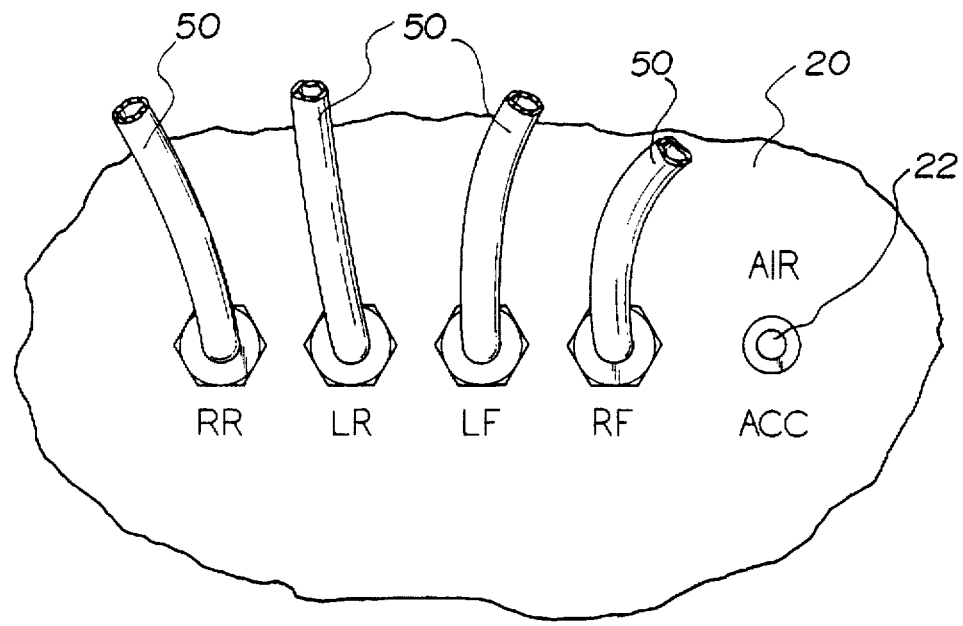
FIG. 5 is a cross sectional view taken along line 5—5 of FIG. 2.

With reference now to the drawings, and in particular to FIGS. 1 through 6 thereof, a new Vehicle Selective Jacking System embodying the principles and concepts of the present invention and generally designated by the reference numeral 10 will be described.

More specifically, it will be noted that the Vehicle Selective Jacking System 10 comprises an air compressor 20 electrically coupled to a power source, a control panel 30 electrically coupled to the air compressor 20, and a plurality of air jack 40 secured to the motor vehicle 12 and connected to the air compressor 20 by tubing 50.

As best illustrated in FIGS. 1 through 4, it can be shown that the air compressor 20 is secured to a vehicle 12. Four air jacks 40 are secured to a front and a rear axle 14 of the vehicle 12 as best shown in FIG. 3 of the drawings. A length of tubing 50 is connected to the air compressor 20 at one end and connected to each air jack 40 opposite of the air compressor 20. The control panel 30 is electrically coupled to the air compressor 20 thereby selectively controlling air pressure to each air jack 40 for elevating or descending the vehicle 12. The air jack 40 has a U-clamp 42 surrounding the axle 14, where said U-clamp 42 engages the air jack 40 by a fastener 44 thereby supporting the air jack 40 juxtaposed to the axle 14 as shown in FIG. 3 of the drawings. The air compressor 20 has at least one support bracket 24 surrounding the air compressor 20 and secured to a bottom surface of the vehicle 12 thereby supporting said air compressor 20. An accessory outlet 22 is secured to the air compressor 20 for coupling to an unnumbered air impact wrench. A cap 26 is removably coupled to the accessory outlet 22 for preventing debris from collecting within.

Figure 6:
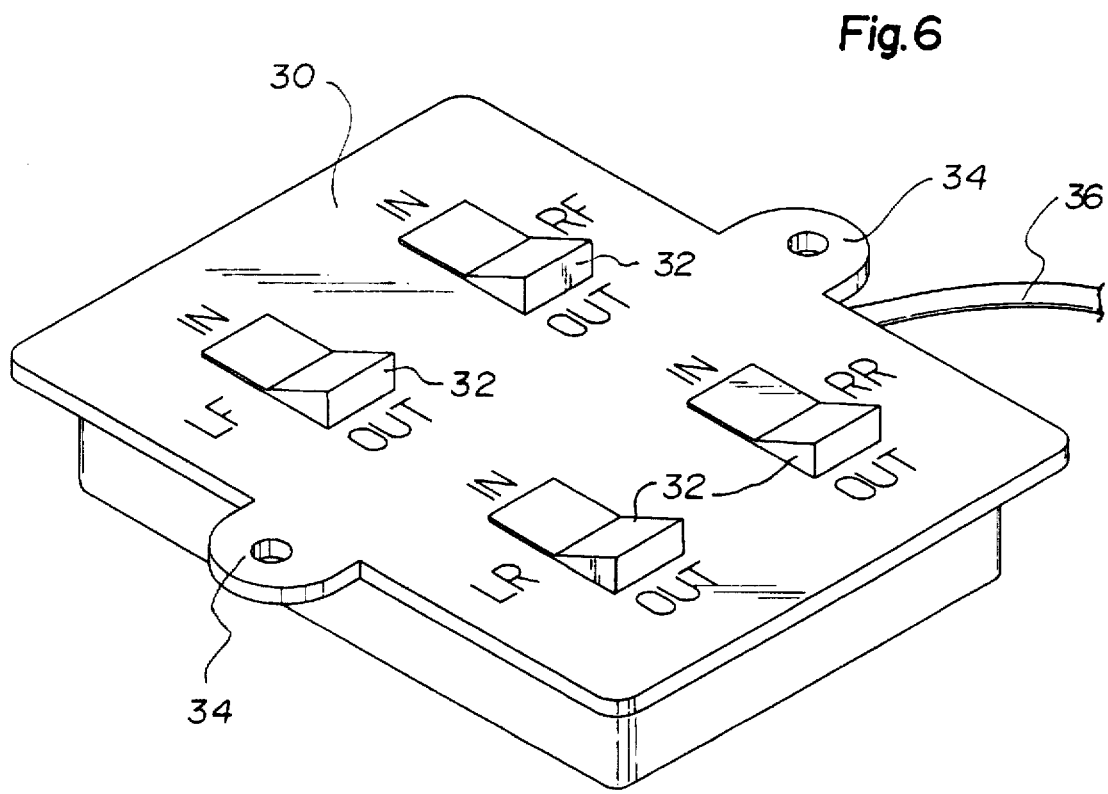
FIG. 6 is a perspective view of the control panel.

As best shown in FIG. 6 of the drawings, the control panel 30 has four switches 32 electrically coupled by connecting wires 36 to the air compressor 20 for controlling the air pressure to each of the four air jacks 40. At least one mounting bracket 34 is secured to the control panel 30 for securing the control panel 30 within the vehicle 12. In an alternative embodiment, a handle 60 is mechanically coupled to the air compressor 20 for manually pumping the air compressor 20.

In use, the air compressor 20 is activated by power from the vehicle's 12 battery or by the handle 60. The user controls which air jack 40 is extended by pressing the selected corresponding switch 32 which controls the air pressure to the selected air jack 40. The user may extend all four of the air jacks 40 or only a selected combination. This allows the user to make the necessary repairs to the vehicle 12 after elevation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle selective jacking system comprising:

an air compressor secured to a vehicle and powered by the electrical system of said vehicle;

an air jack secured to each axle of said vehicle;

at least one length of tubing connected to said air compressor at one end and connected to said air jack at the other end; and a control panel electrically coupled to said air compressor selectively controlling air pressure to said air jack for elevating or descending said vehicles;

wherein each said air jack includes at least one U-clamp surrounding said axle and engaging said air jack by a fastener to thereby mount said air jack on said axle;

wherein said air compressor includes:

at least one support bracket surrounding said air compressor and secured to a bottom surface of said vehicle;

an accessory outlet for coupling to an air impact wrench; and a cap removably coupled to said accessory outlet for preventing debris from collecting within said accessory outlet;

wherein said control panel includes:

a switch electrically coupled to said air compressor for controlling said air pressure to said air jack; and at least one mounting bracket secured to said control panel for securing said control panel within said vehicle;

wherein a handle is mechanically coupled to said air compressor for manually pumping said air compressor upon loss of electrical power from said vehicle;

wherein said control panel includes at least one switch electrically coupled to said air compressor for controlling said air pressure to each said air jack.

* * * * *